Oct. 1, 1935.                J. M. WHITE                2,015,829
BRAKE SHOE
Filed Sept. 12, 1933
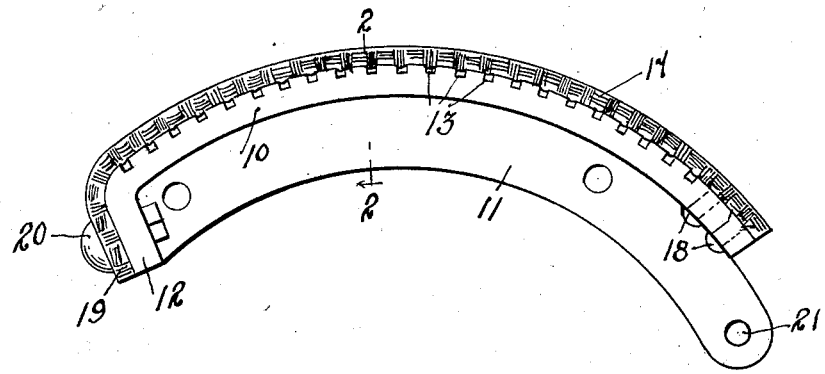
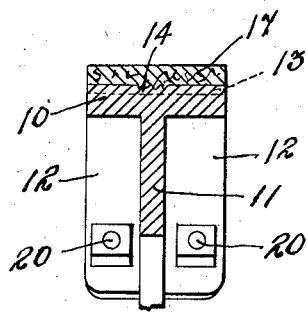
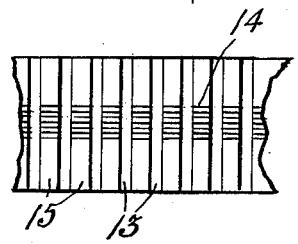
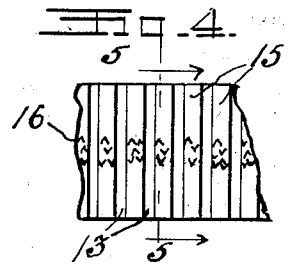
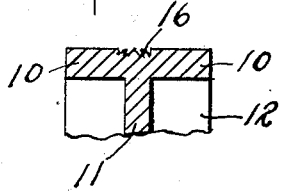
INVENTOR
Jesse M. White
BY Joshua R. H. Potts
HIS ATTORNEY Patented Oct. 1, 1935

2,015,829

UNITED STATES PATENT OFFICE 2,015,829

BRAKE SHOE

Jesse M. White, Philadelphia, Pa.

Application September 12, 1933, Serial No. 689,081

5 Claims. (Cl. 188—234)

This invention relates to brake shoes and has for an object to provide improved means for attaching a lining to a brake shoe to provide for cooling the shoe and lining.

A further object of the invention is to provide means for attaching the lining to a brake shoe wherein the lining is held against both rotative and transverse movement by the condition of the face of the shoe.

A further object of the invention is to provide means for attaching the lining to a brake shoe whereby no rivets or other fastening will come in contact with the brake shoe as the lining wears.

The invention, therefore, comprises a brake shoe of any approved type, and for use with any desired brake actuating mechanism, said brake shoe having grooves transversely thereof, into which the brake lining is forced in part leaving, however, openings beneath the brake lining for exposure to the air or through which air may be forced or induced for the purpose of cooling the shoe and lining.

The drawing illustrates several embodiments of the invention and the views therein are as follows:

Figure 1 is a view in side elevation of a shoe with the lining attached thereto, Figure 2 is a transverse sectional view taken on line 2—2 of Figure 1, Figure 3 is a view in plan of the shoe with the lining removed, Figure 4 is a view in plan of a modified type of shoe, showing improved means for holding the lining against transverse movement, and Figure 5 is a transverse sectional view taken on on line 5—5 of Figure 4.

Like characters of reference indicate corresponding parts throughout the several views.

The brake shoe which enters into the present invention may assume a great variety of forms to correspond to the requirement of the brake actuating mechanism and other features of the brake structure and drum, and the showing in the drawing is intended as no limitation upon any such form as may be assumed. The shoe will obviously be provided with bearings and other accessorial features to cooperate with securing and operating mechanisms from within a brake structure of a vehicle.

The shoe is provided with reversely extending flanges 10 of such curvature as to cooperate with the drum with which it is associated, and with a web 11 merely as a supporting and reinforcing member.

At one end the flanges 10 are turned downwardly, as shown at 12, for the purpose which will be hereinafter more fully described.

The face of the shoe is provided with transverse slots 13. The showing in the drawing of these slots as substantially rectangular is to be understood as no limitation as the slots may be semi-cylindrical or any other form which it is found convenient to employ in the manufacture.

In one type, that shown at Figures 2 and 3, the face is also provided with grooves 14 which extend along the arc of the face. In the other type, as shown at Figures 4 and 5, the ribs 15 which interlay the grooves 13 are provided with penetrating points 16.

The brake lining 17 which may be of any usual and ordinary type, either woven, molded or produced in any other manner, is attached to the brake shoe adjacent to one end as by rivets 18. After such attachment, the material of the lining is forced into the grooves 13 and 14, or into engagement with the penetrating points 16, which is drawn over under stress at 19 over the turned down ends 12 of the flanges. It is here secured by means of a bolt or bolts 20, which are so positioned that they are out of the range of possibility of engagement with the drum when the brake is applied.

It is to be assumed that the shoe will be pivoted at 21, or in some equivalent manner, whereby the parts secured by the rivets 18 will make but relatively slight contact with the drum, the greater pressure being applied remote from such pivots 21 and from that position to the end of the shoe secured by the bolt 20, the pressure upon the drum will increase and wear will likewise increase.

With the shoe as shown mounted in association with a brake operating organization, it will be apparent that the entire material of the lining 17 may be worn away without any of the metallic parts coming in contact with the drum, as distinguished from the usual manner of mounting such linings, wherein the rivets come in contact with and score the drum, following only a partial wear of the lining.

While this shoe so constructed is of general utility, it is more particularly adapted for use in conjunction with some type of brake cooling device, such for example as disclosed in my co-pending application Serial No. 634,262, filed September 22, 1932, which embodies a circumferential series of fan blades, carried by the brake drum, and adapted to force air through the transverse slots 13.

Of course, the brake shoe herein described may be modified and changed in various ways without departing from the invention herein set forth and hereafter claimed.

I claim:—

1. A brake shoe comprising a face having transversely extending grooves, and a lining applied to said face and forced into said grooves a distance less than the depth of the grooves, whereby air passages are maintained between the shoe and the lining.

2. A brake shoe provided with transversely extending slots, a brake lining applied to the shoe and forced a limited distance within the slots providing air passages between the shoe and the lining, and other means carried by the shoe engaging the lining to prevent transverse movement of the lining relative to the shoe.

3. A brake shoe comprising an arcuate face having transverse slots and longitudinal slots crossing the transverse slots, said transverse slots being deeper than the longitudinal slots, a brake lining applied to the face and forced into said slots, the part forced into the transverse slots being less than sufficient to fill said slots.

4. A brake shoe provided with an arcuate face having transversely extending slots forming interlying ridges penetrating points upstanding from said ridges, a brake lining applied to the arcuate face and forced into the slots and the penetrating points forced into the lining, the amount of entry into the transverse slots being less than sufficient to fill said slots.

5. A brake shoe comprising an arcuate face having transversely extending slots, a brake lining secured adjacent to one end of the shoe and spanning the slots and turned down at its opposite end and secured at such turned down end within the arcuature of the face, said lining being forced into said slots a distance less than the depth of the slots, whereby air passages between the shoe and lining are maintained.

JESSE M. WHITE.